(12) United States Patent
Yamashita et al.

(10) Patent No.: US 12,504,065 B2
(45) Date of Patent: Dec. 23, 2025

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Hirohisa Yukawa, Tokyo (JP); Masahiro Kouya, Kanagawa (JP); Tomoo Ikeda, Gunma (JP); Kenji Kojima, Kanagawa (JP); Akira Higashiyama, Kanagawa (JP); Yasuaki Yumoto, Tokyo (JP); Tsutomu Itou, Shizuoka (JP); Kazuya Numata, Fuji (JP); Junnosuke Kawahara, Kanagawa (JP); Kazunori Akiyama, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,999

(22) PCT Filed: Mar. 23, 2023

(86) PCT No.: PCT/JP2023/011618
§ 371 (c)(1),
(2) Date: Sep. 13, 2024

(87) PCT Pub. No.: WO2023/182455
PCT Pub. Date: Sep. 28, 2023

(65) Prior Publication Data
US 2025/0207661 A1    Jun. 26, 2025

(30) Foreign Application Priority Data

Mar. 23, 2022  (JP) .................................. 2022-047615

(51) Int. Cl.
F16H 57/04    (2010.01)
F16H 57/035   (2012.01)
F16H 57/037   (2012.01)

(52) U.S. Cl.
CPC ..... *F16H 57/0435* (2013.01); *F16H 57/0404* (2013.01); *F16H 57/0424* (2013.01);
(Continued)

(58) Field of Classification Search
CPC .. F16H 57/035; F16H 57/037; F16H 57/0404; F16H 57/0436; F16H 57/0439;
(Continued)

(56) References Cited

U.S. PATENT DOCUMENTS 9,845,869 B2 * 12/2017 Shirasaka ........... F16H 61/0031
11,434,977 B2 * 9/2022 Takahashi ............... F16H 57/04
(Continued)

FOREIGN PATENT DOCUMENTS

JP    2015-135155 A    7/2015
JP    2023141341 A *   10/2023
(Continued)

*Primary Examiner* — Adam D Rogers
(74) *Attorney, Agent, or Firm* — Global IP Counselors, LLP

(57) ABSTRACT

A power transmission device includes a case that houses a power transmission mechanism, a control valve arranged upright inside the case, and first and second pumps configured to supply oil to the control valve. The case has a first support wall that supports an axis of rotation of the power transmission mechanism, a second support wall that supports the control valve and is arranged aligned with the axis of rotation, a first chamber located on one side of the first support wall, a second chamber adjacent to the first chamber across the second support wall, and a third support wall extending from the second support wall along the axis of rotation to the other side of the first support wall. The first (Continued)

pump is mounted on the first support wall inside the first chamber. The second pump is mounted on the third support wall inside the second chamber.

9 Claims, 10 Drawing Sheets

(52) U.S. Cl.
CPC ..... *F16H 57/0441* (2013.01); *F16H 57/0445* (2013.01); *F16H 57/035* (2013.01); *F16H 57/037* (2013.01)

(58) Field of Classification Search
CPC ............ F16H 57/0424; F16H 57/0435; F16H 57/0441; F16H 57/0445
See application file for complete search history.

(56) References Cited

U.S. PATENT DOCUMENTS

| | | | |
|---|---|---|---|
| 11,859,714 B2 * | 1/2024 | Yukawa | F16H 61/0006 |
| 2016/0319930 A1 | 11/2016 | Shirasaka et al. | |
| 2022/0349469 A1 | 11/2022 | Yukawa et al. | |
| 2025/0067333 A1 * | 2/2025 | Tsuchida | F16H 57/0436 |
| 2025/0189033 A1 * | 6/2025 | Yamashita | F16H 57/0424 |
| 2025/0198500 A1 * | 6/2025 | Yamashita | F16H 57/031 |
| 2025/0198503 A1 * | 6/2025 | Tsuchida | F16H 57/0439 |
| 2025/0198504 A1 * | 6/2025 | Yamashita | F16H 57/0441 |
| 2025/0207660 A1 * | 6/2025 | Yamashita | F16H 57/0423 |
| 2025/0215968 A1 * | 7/2025 | Yamashita | F16H 57/0404 |
| 2025/0224029 A1 * | 7/2025 | Yamashita | F16H 57/0435 |
| 2025/0224032 A1 * | 7/2025 | Kouya | F16H 61/0006 |

FOREIGN PATENT DOCUMENTS

| | | | | |
|---|---|---|---|---|
| WO | 2015/107979 A1 | 7/2015 | | |
| WO | 2019/176329 A1 | 9/2019 | | |
| WO | 2021/015205 A1 | 1/2021 | | |
| WO | WO-2023182445 A1 * | 9/2023 | | F16H 57/02 |
| WO | WO-2023182446 A1 * | 9/2023 | | F16H 57/04 |
| WO | WO-2023182447 A1 * | 9/2023 | | F16H 57/035 |
| WO | WO-2023182449 A1 * | 9/2023 | | F16H 57/00 |
| WO | WO-2023182450 A1 * | 9/2023 | | F16H 57/04 |
| WO | WO-2023182451 A1 * | 9/2023 | | F16H 61/662 |
| WO | WO-2023182453 A1 * | 9/2023 | | F16H 57/02 |
| WO | WO-2023182454 A1 * | 9/2023 | | F16H 57/02 |
| WO | WO-2023182456 A1 * | 9/2023 | | F16H 57/00 |

* cited by examiner

POWER TRANSMISSION DEVICE

CROSS-REFERENCE TO RELATED APPLICATIONS

This application is a U.S. national stage application of International Application No. PCT/JP2023/011618, filed on Mar. 23, 2023. This application also claims priority to Japanese Patent Application No 2022-047615, filed on Mar. 23, 2022.

BACKGROUND

Technical Field

The present invention relates to a power transmission device.

Background Information

International Publication No. 2015/107979 discloses a drive device for a vehicle.

SUMMARY

In this drive device, a mechanical oil pump and an electric oil pump share a strainer. The strainer is provided in a cantilevered support state on the mechanical oil pump.

The electric oil pump and the mechanical oil pump are mounted on both sides of the same wall section to enable sharing of the strainer.

Both the mechanical oil pump and the electric oil pump act as sources of vibration. Therefore, to suppress vibrations, it is necessary to increase the thickness of the wall section to enhance the support stability of the mechanical oil pump and the electric oil pump.

When the mechanical oil pump and the electric oil pump are mounted on the same wall section, it is necessary to make the wall section thicker. However, increasing the thickness of the wall section causes the axial dimension of the drive device to increase by the amount the wall section is thickened.

Therefore, in this type of drive device (power transmission device) equipped with two pumps, there is a demand to enhance the support stability of the two pumps while suppressing an increase in size.

An aspect of the present disclosure is a power transmission device, comprising a case that houses a power transmission mechanism, a control valve that controls oil pressure supplied to the power transmission mechanism and is upright inside the case, and a first pump and a second pump that supply oil to the control valve, wherein the case has a first support wall that supports an axis of rotation of the power transmission mechanism, a second support wall that supports the control valve and is arranged aligned with the axis of rotation, a first chamber located on one side of the first support wall, a second chamber adjacent to the first chamber across the second support wall, and a third support wall extending from the second support wall along the axis of rotation to the other side of the first support wall, the first pump is mounted on the first support wall inside the first chamber, and the second pump is mounted on the third support wall inside the second chamber.

According to one aspect of the present disclosure, it is possible to enhance the support stability of the two pumps while suppressing an increase in size.

BRIEF DESCRIPTION OF THE DRAWINGS

Referring now to the attached drawings which form a part of this original disclosure.

DETAILED DESCRIPTION

Figure 1:
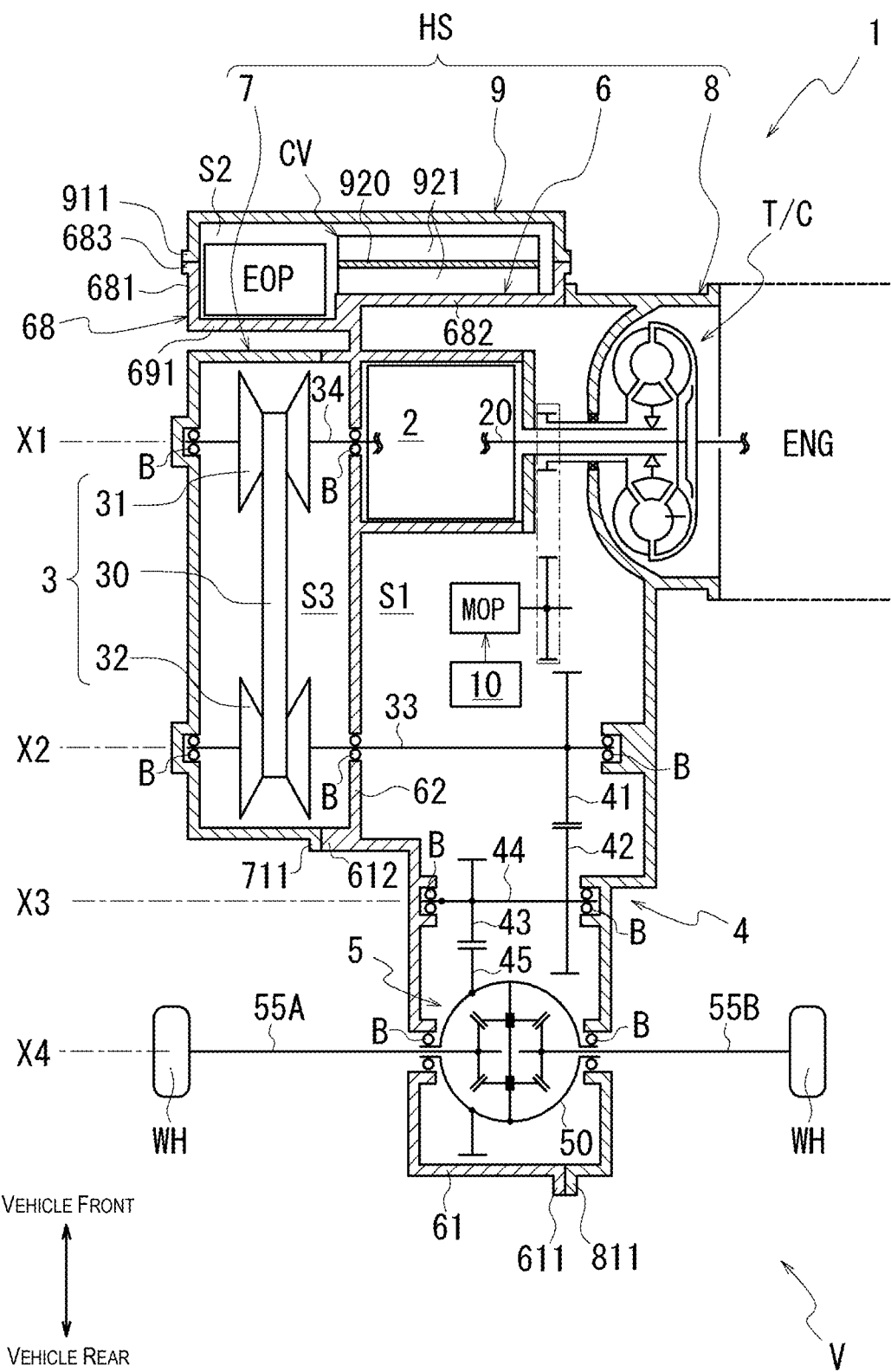
FIG. 1 is a schematic diagram showing a general configuration of the power transmission device.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device need only transmit the output rotation of at least one of an engine or a motor (rotating electrical machine).

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping as viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"The downstream side in the direction of rotation" means the downstream side in the direction of rotation when the vehicle is advancing or the direction of rotation during vehicle forward movement or during vehicle backward movement. It is appropriate to assume the downstream side in the direction of rotation is during vehicle forward movement, which is frequently the case.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves (valve bodies) inside the control valve are arranged spaced out in the vertical line VL direction.

In this case, the plurality of pressure regulating valves need not be strictly arranged in single file in the vertical line VL direction.

For example, if the plurality of valve bodies are stacked to form the control valve, the following is possible. Namely, the plurality of pressure regulating valves may be arranged in the vertical line VL direction with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the vertical line VL direction.

As viewed from the axial direction of the valve bodies provided with the pressure regulating valves (the direction of forward and backward movement), the plurality of pressure regulating valves need not be adjacent in the vertical line VL direction.

Hence, if, for example, the pressure regulating valves arranged in the vertical line VL direction are arranged with shifted positions in the stacking direction (horizontal line direction) of the valve bodies, then cases are also included in which, as viewed from the stacking direction, the pressure regulating valves that are adjacent in the vertical line VL direction are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present invention is described below.

FIG. 1 is a schematic diagram illustrating the arrangement of a power transmission device 1.

As shown in FIG. 1, a housing HS of the power transmission device 1 is configured by a case 6, a first cover 7, a second cover 8, and a third cover 9.

The interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, strainer 10, etc.

The torque converter T/C, the forward-reverse switching mechanism 2, the variator 3, the reduction mechanism 4, the differential device 5 are components of the power transmission mechanism in the invention.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear 42 meshes with the output gear 41 in a manner allowing transmission of rotation. The idler gear 42 rotates together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3.

The final gear 45 and the drive shafts 55A, 55B are arranged coaxially on a common axis of rotation X4. In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 2:
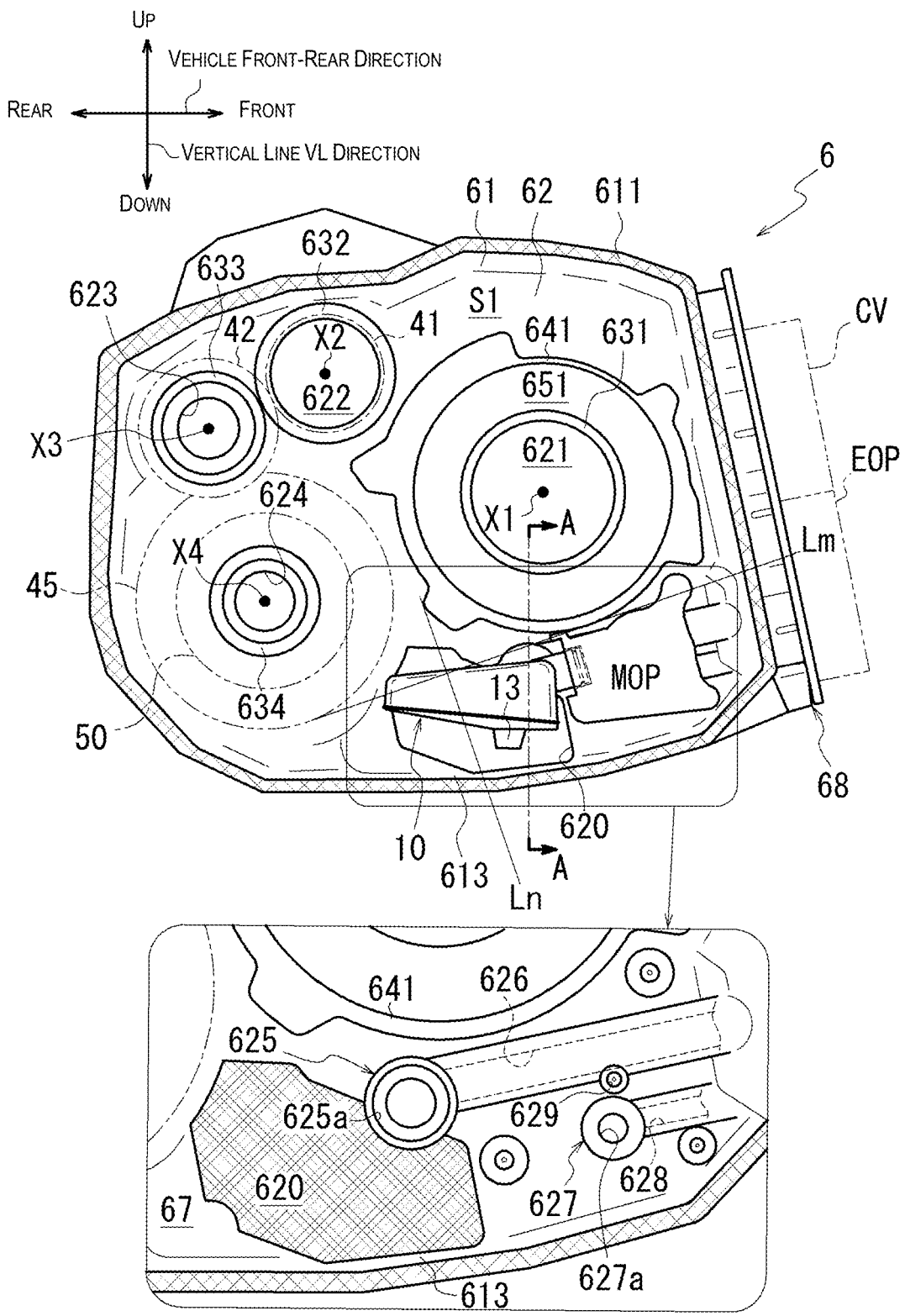
FIG. 2 is a view of the case as viewed from the second cover side.

FIG. 2 is a schematic diagram showing the case 6 as viewed from the side of the second cover 8.

Figure 3:
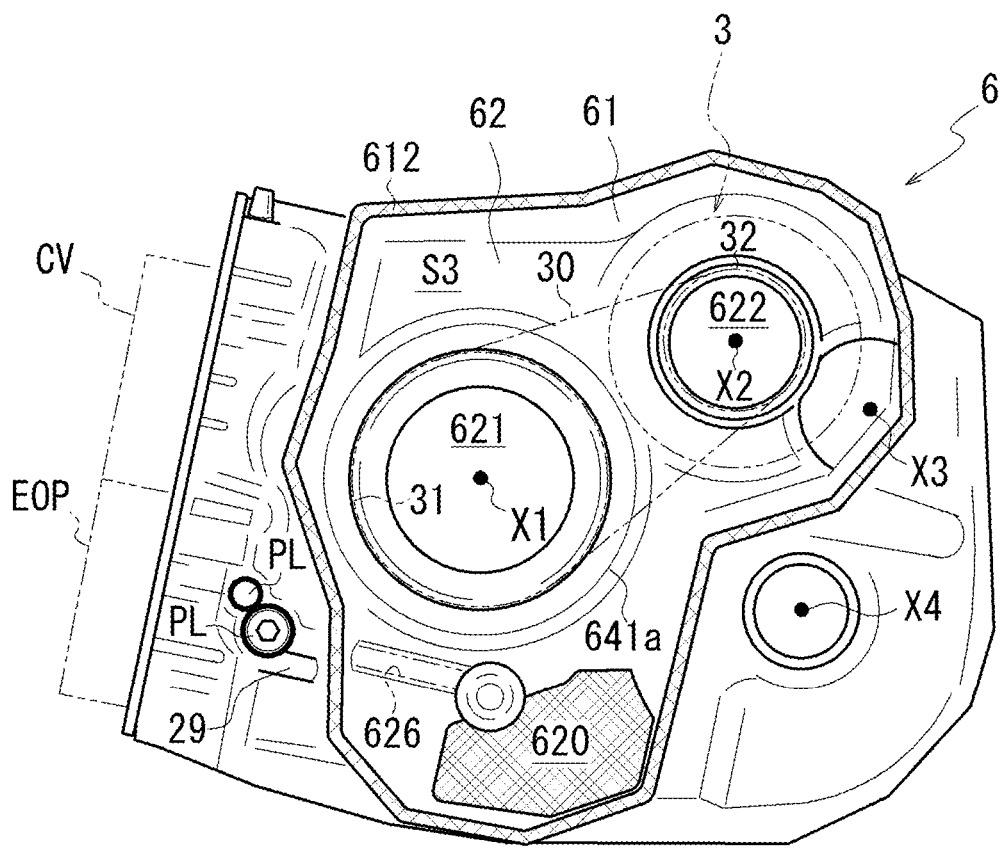
FIG. 3 is a view of the case as viewed from the third cover side.
Figure 3:
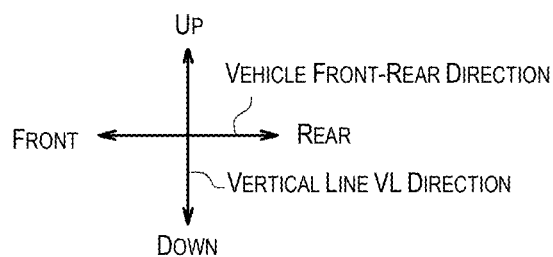

FIG. 3 is a schematic diagram showing the case 6 as viewed from the side of the first cover 7.

Note that in the enlarged view of FIG. 2, the strainer 10 and the mechanical oil pump MOP are omitted, and the areas around the connecting sections 625, 627 provided in the partition section 62 are shown. Furthermore, in the enlarged view of FIG. 2 and in FIG. 3, crosshatching is applied to the area of the opening 620 to clarify the location of the opening 620.

As shown in FIG. 2, the case 6 has a cylindrical circumferential wall section 61 and a partition section 62.

As shown in FIG. 1, the partition section 62 divides the space inside the circumferential wall section 61 into two in the direction of the axis of rotation X1. One side of the partition section 62 in the direction of the axis of rotation X1 is the first chamber S1, and the other side is the third chamber S3.

In the case 6, an opening on the side of the first chamber S1 is sealed by the second cover 8 (torque converter cover), forming the closed first chamber S1. The opening on the side of the third chamber S3 is sealed by the first cover 7 (side cover), forming the closed third chamber S3.

The first chamber S1 houses a forward-reverse switching mechanism 2, a reduction mechanism 4, and a differential device 5. The third chamber S3 houses a variator 3.

In the case 6, a housing section 68 that forms the second chamber S2 is attached to the outer circumference of the circumferential wall section 61 on the vehicle front side. The housing section 68 is provided with an opening facing the front of the vehicle. The opening of the housing section 68 is sealed by the third cover 9, forming the closed second chamber S2.

The second chamber S2 is provided with a control valve CV and an electric oil pump EOP.

As shown in FIG. 1, the control valve CV has a basic structure in which a separation plate 920 is sandwiched between valve bodies 921, 921. Inside the control valve CV, an oil pressure control circuit (not shown in the drawings) is formed. The oil pressure control circuit is equipped with pressure regulating valves SP (spool valves) that operate based on signal pressures generated by solenoids driven according to commands from a control device (not shown in the drawings).

Inside the second chamber S2, the control valve CV is arranged upright with the stacking direction of the valve bodies 921, 921 aligned in the vehicle front-rear direction.

This configuration positions the direction of advancement and retraction of the spool valves inside the control valve along the horizontal line direction. Furthermore, the spool valves inside the control valve are staggered in the vertical line VL direction. Therefore, the second chamber S2 is prevented from increasing in size in the vehicle front-rear direction while preventing the movement of the spool valves from being hindered.

As shown in FIG. 2, the partition section 62 of the case 6 is provided across the range that intersects the axes of rotation (axis of rotation X1 through axis of rotation X4). The partition section 62 is provided in a direction substantially orthogonal to the axes of rotation (axis of rotation X1 through axis of rotation X4).

The partition section 62 is equipped with through-holes 621, 622, 624, and a support hole 623.

The through-hole 621 is formed around the axis of rotation X1. On the surface of the partition section 62 on the side of the first chamber S1 (toward the viewer), there is a cylindrical support wall section 631 surrounding the through-hole 621, and a circumferential wall section 641 that surrounds the outer circumference of the support wall section 631 with a gap therebetween. In FIG. 2, the support wall section 631 and the circumferential wall section 641 protrude toward the viewer (the side of the second cover 8 in FIG. 1).

The area 651 between the support wall section 631 and the circumferential wall section 641 is a cylindrical space that houses a piston (not shown in the drawings) of the forward-reverse switching mechanism 2, and friction plates (forward clutch, reverse brake).

The inner circumference of the support wall section 631 rotatably supports the input shaft 34 of the primary pulley 31 (see FIG. 1) via bearings B.

As shown in FIG. 2, the through-hole 622 is formed around the axis of rotation X2.

In the power transmission device 1 mounted in the vehicle V, the axis of rotation X2 is positioned diagonally above toward the rear of the vehicle when viewed from the axis of rotation X1.

The circumferential wall section 632 surrounding the through-hole 622 rotatably supports the output shaft 33 of the secondary pulley 32 (see FIG. 1).

As shown in FIG. 2, the support hole 623 is a closed-bottom hole formed around the axis of rotation X3.

In the power transmission device 1 mounted in the vehicle V, the axis of rotation X3 is positioned diagonally above toward the rear of the vehicle when viewed from the axis of rotation X1, and diagonally below toward the rear of the vehicle when viewed from the axis of rotation X2.

The circumferential wall section 633 surrounding the support hole 623 rotatably supports the idler shaft 44 (see FIG. 1).

As shown in FIG. 2, the through-hole 624 is formed centered around the axis of rotation X4.

In the power transmission device 1 mounted in the vehicle V, the axis of rotation X4 is positioned diagonally below toward the rear of the vehicle when viewed from the axis of rotation X1, diagonally below toward the rear of the vehicle when viewed from the axis of rotation X2, and diagonally below toward the front of the vehicle when viewed from the axis of rotation X3.

A cylindrical support wall section 634 surrounding the through-hole 624 is provided on the surface of the partition section 62 facing the first chamber S1 (toward the viewer). The differential case 50 (see FIG. 1) of the differential device 5 is rotatably supported on the inner circumference of the support wall section 634 via bearings B. The drive shaft 55A extending from the differential case 50 passes through the through-hole 624.

As shown in FIG. 1, the final gear 45, which forms a ring shape when viewed from the direction of the axis of rotation X4, is fixed to the outer circumference of the differential case 50. The final gear 45 rotates around the axis of rotation X4 together with the differential case 50.

Thus, the partition section 62 functions as a support wall for the input shaft 34 of the primary pulley 31, the output shaft 33 of the secondary pulley 32, the idler shaft 44, the differential case 50, and the drive shaft 55A.

In the case 6, the area below the arcuate circumferential wall section 641, which is toward the front of the vehicle from the final gear 45, serves as the housing section 67 for the strainer 10 and the mechanical oil pump MOP.

The housing section 67 is located at the lower part of the case 6 (a housing HS). Therefore, the housing section 67 collects the oil OL used for driving and cooling the components of the power transmission mechanism.

Figure 4:
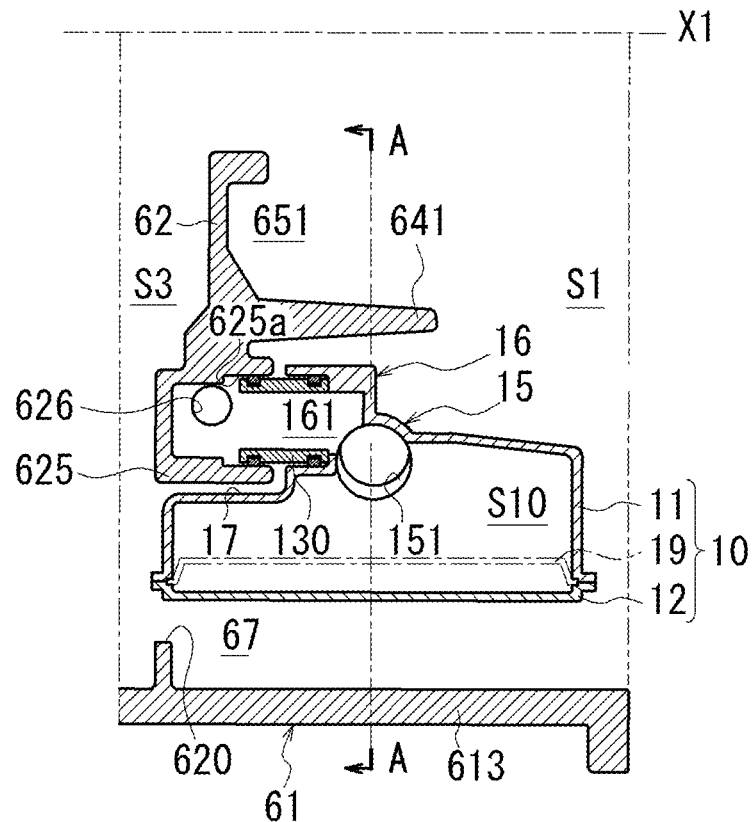
FIG. 4 is a schematic diagram of a cross-section of the housing along line A-A in FIG. 2.

As shown in FIG. 4, the housing section 67 is a closed-end space with an opening facing the side of the first chamber S1 (the right side in FIG. 4).

In the lower part of the case 6, the housing section 67 is formed across a range that crosses below the area 651 where the forward-reverse switching mechanism 2 is housed, in the direction of the axis of rotation X1.

The opening 620 that penetrates the partition section 62 in the direction of the axis of rotation X1 is formed at the bottom of the partition section 62. The first chamber S1 and the third chamber S3 inside the case 6 communicate with each other through this opening 620.

As shown in FIG. 2, when viewed from the direction of the axis of rotation X1, the opening 620 is provided at a position overlapping with the tangent line Lm. Here, the tangent line Lm is a line connecting the outer circumference of the arcuate circumferential wall section 641 surrounding the forward-reverse switching mechanism 2 (not shown in the drawings) and the outer circumference of the final gear 45.

The opening 620 is formed from the area between the circumferential wall section 641 and the final gear 45, extending along the straight line Ln, crossing the tangent line Lm from above to below, down to the lower part of the case 6. Here, the straight line Ln is a line that passes between the circumferential wall section 641 and the final gear 45 and is orthogonal to the tangent line Lm.

In the power transmission device 1, the area between the circumferential wall section 641 and the final gear 45 tends to be unused dead space, but this dead space is effectively utilized by providing the opening 620.

As shown in FIG. 4, in the housing section 67, the connection section 625 for the strainer 10 is provided at a position adjacent to the circumferential wall section 641. The connection section 625 is a cylindrical part with a connection port 625a facing the second cover 8 side (the side of the first chamber S1).

As shown in FIG. 2, when viewed from the direction of the axis of rotation X1, the connection section 625 is provided in a positional relationship such that part of a lower area overlaps with the opening 620. From the direction of the axis of rotation X1, part of the lower area of the connection section 625 protrudes into the opening 620.

As shown in FIG. 4, an oil path 626 opens behind the connection section 625.

As shown in FIG. 2, the oil path 626 extends in a straight line away from the opening 620 inside the partition section 62. The oil path 626 connects to the electric oil pump EOP housed in the housing section 68 via the oil path 281 inside the case 6 (see FIG. 10).

As shown in FIG. 2, in the housing section 67, the connection section 627 for the mechanical oil pump MOP is provided below the oil path 626. A connection port 627a of the connection section 627 opens in the same direction as the connection port 625a of the aforementioned connection section 625. The connection port 627a of the connection section 627 connects to the oil path 628 provided in the partition section 62.

The oil path 628 extends along the oil path 626 to the side of the housing section 68 (right side in the diagram) below the aforementioned oil path 626. The oil path 628 connects to the control valve CV installed in the housing section 68 via the oil path inside the case 6 (see FIG. 12).

As shown in FIG. 3, on the side of the case 6 facing the first cover 7, the partition section 62 is located inside the circumferential wall section 61 that surrounds the third chamber S3, and the opening 620 is located at the bottom of the partition section 62. Additionally, the through-holes 621 and 622 are open inside the circumferential wall section 61, above the partition section 62.

Inside the circumferential wall section 61, the primary pulley 31 and the secondary pulley 32 of the variator 3 are positioned in the upper region in the vertical line VL direction.

The lower side of the circumferential wall section 61 where the primary pulley 31 is provided bulges significantly toward the lower side of the case 6, and the opening 620 is positioned at the very bottom of this bulging area.

During operation of the power transmission device 1, the oil OL supplied through an oil path not shown in the drawings is sprayed toward the belt 30 of the variator 3 inside the third chamber S3, thereby lubricating the belt 30 of the variator 3.

The oil OL that lubricates the belt 30 moves by gravity toward the lower part of the third chamber S3 where the opening 620 is provided, and passes through the opening 620 to return to the lower part of the first chamber S1 where the strainer 10 is positioned.

FIG. 4 is a schematic diagram of a cross-section of the housing HS along line A-A in FIG. 2. FIG. 4 shows the area around the connection section between the strainer 10 and the partition section 62.

Figure 5:
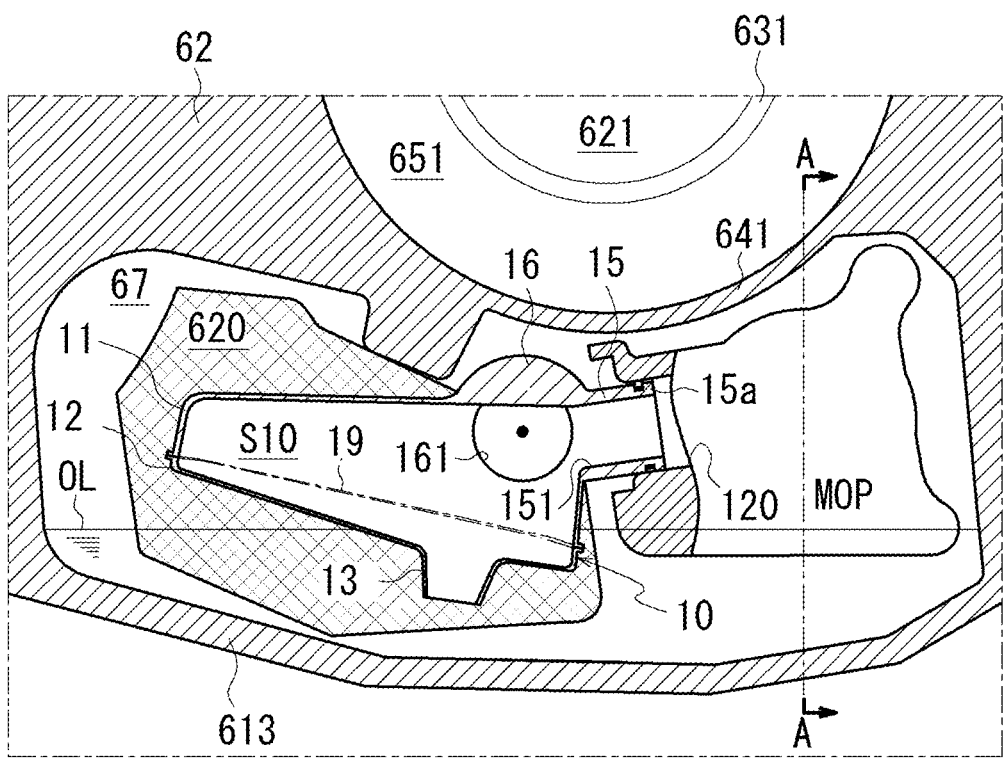
FIG. 5 is a schematic diagram of a cross-section of the housing along line A-A in FIG. 4.

FIG. 5 is a schematic diagram of a cross-section of the housing HS along line A-A in FIG. 4. FIG. 5 schematically shows the arrangement of the strainer 10 and the mechanical oil pump MOP in the housing section 67.

Figure 6:
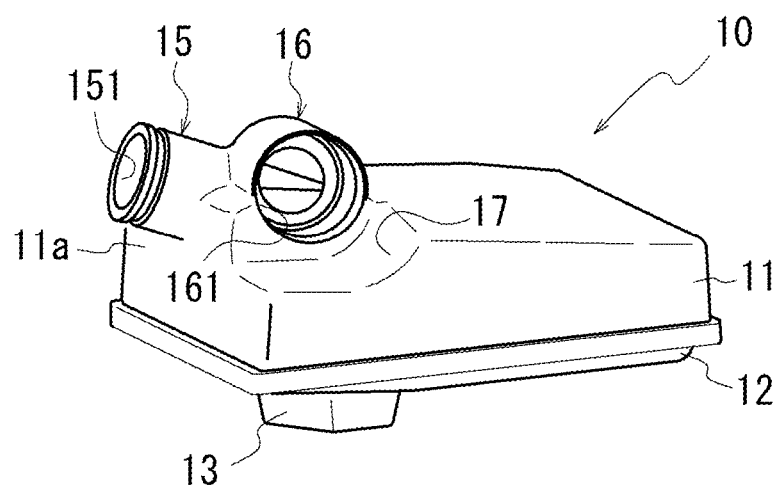
FIG. 6 is a perspective view of the strainer as viewed from above on the upper case side.

FIG. 6 is a perspective view of the strainer 10 viewed from above on the upper case 11 side.

As shown in FIGS. 4 and 5, the strainer 10 has a basic configuration in which a filter 19 is positioned within a space S10 formed between the upper case 11 and the lower case 12.

As shown in FIG. 6, a first connection section 15 is provided on one side 11a of the upper case 11. The first connection section 15 is a cylindrical member with an internal oil discharge path 151 therein, and the first connection section 15 protrudes diagonally upward from one side 11a of the upper case 11.

A second connection section 16 is provided at the base of the first connection section 15. As shown in FIG. 4, the second connection section 16 forms a closed-end cylindrical shape with an internal oil OL discharge path 161.

The first connection section 15 and the second connection section 16 are arranged such that the opening directions of the discharge paths 151 and 161 are orthogonal to each other.

The discharge path 161 inside the second connection section 16 and the discharge path 151 inside the first connection section 15 open into the internal space S10 of the strainer 10.

As shown in FIG. 6, in the upper case 11, a notch 17 recessed toward the side of the lower case 12 (cut-out) is provided in the area located along the extension of the discharge path 161 of the second connection section 16. Therefore, as shown in FIG. 4, a cylindrical member 130 for connecting the strainer 10 and the connection section 625 on the partition section 62 side can be inserted from the side of the strainer 10 into the discharge path 161 without interfering with the upper case 11.

As shown in FIG. 2, a suction port 13 is provided facing the bottom wall section 613 of the strainer 10. Here, the bottom wall section 613 is an area located at the lower part of the circumferential wall section 61 of the case 6 in the vertical line VL direction, based on the installation state of the power transmission device 1 in the vehicle V.

As shown in FIG. 5, the strainer 10 is attached to the mechanical oil pump MOP by inserting a tip 15a side of the first connection section 15 into a connection port 120 on the side of the mechanical oil pump MOP. The mechanical oil pump MOP is designed to be attached to the partition section 62, and the strainer 10 is supported by the partition section 62 via the mechanical oil pump MOP.

Figure 7:
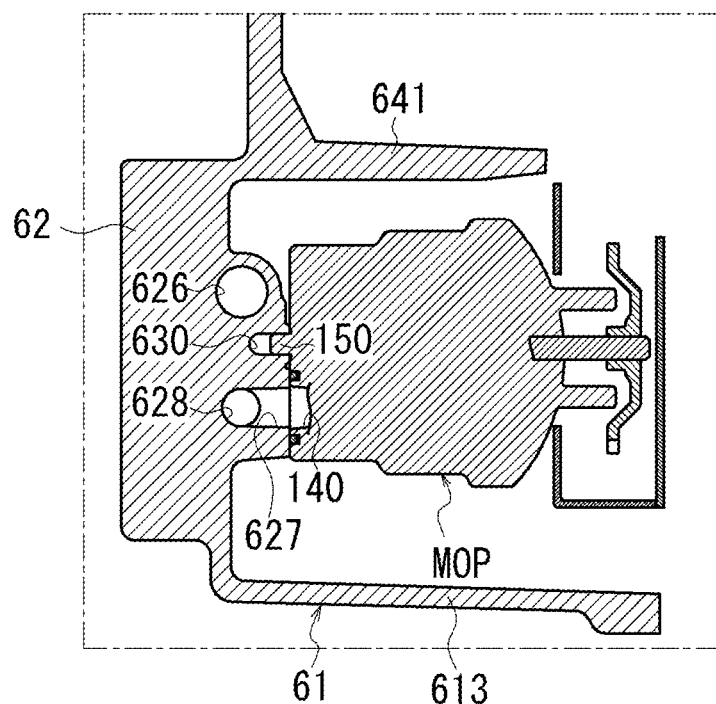
FIG. 7 is a diagram illustrating the support structure of the mechanical oil pump in the partition section.

FIG. 7 is a diagram illustrating the support structure of the mechanical oil pump MOP in the partition section 62. FIG. 7 shows a schematic cross-section of the mechanical oil pump MOP along line A-A in FIG. 5.

As shown in FIG. 7, the part of the partition section 62 facing the mechanical oil pump MOP is provided with a positioning protrusion 150 and a discharge port 140 for the oil OL.

In the partition section 62, an insertion hole 630 and the connection section 627 open on the surface facing the mechanical oil pump MOP.

The mechanical oil pump MOP is positioned at a predetermined location on the partition section 62 by inserting the protrusion 150 into the insertion hole 630 of the partition section 62. In this state, the mechanical oil pump MOP is fixed to the partition section 62 with bolts not shown in the drawings.

When the mechanical oil pump MOP is fixed to the partition section 62, a discharge port 140 of the mechanical oil pump MOP is positioned to face the connection section 627 on the side of the partition section 62, allowing the discharge port 140 and the connection section 627 to communicate. The connection section 627 connects to the oil path 628 inside the partition section 62. Therefore, the oil OL discharged from the discharge port 140 of the mechanical oil pump MOP passes through the connection section 627 and is supplied to the oil path 628. The oil OL supplied to the oil path 628 is then supplied to the control valve CV housed in the housing section 68 (see FIG. 12).

The direction of attachment of the mechanical oil pump MOP to the partition section 62 (left-right direction in FIG. 7) is the same as the direction of attachment of the second connection section 16 of the strainer 10 to the partition section 62 (left-right direction in FIG. 4). Therefore, when the mechanical oil pump MOP is attached to the partition section 62 the second connection section 16 of the strainer 10 is connected almost simultaneously to the connection section 625 on the side of the partition section 62 via the cylindrical member 130.

In this state, the strainer 10 is supported by the first connection section 15 on the mechanical oil pump MOP, while the second connection section 16 is attached to the partition section 62 via the cylindrical member 130 inserted into the second connection section 16.

Figure 8:
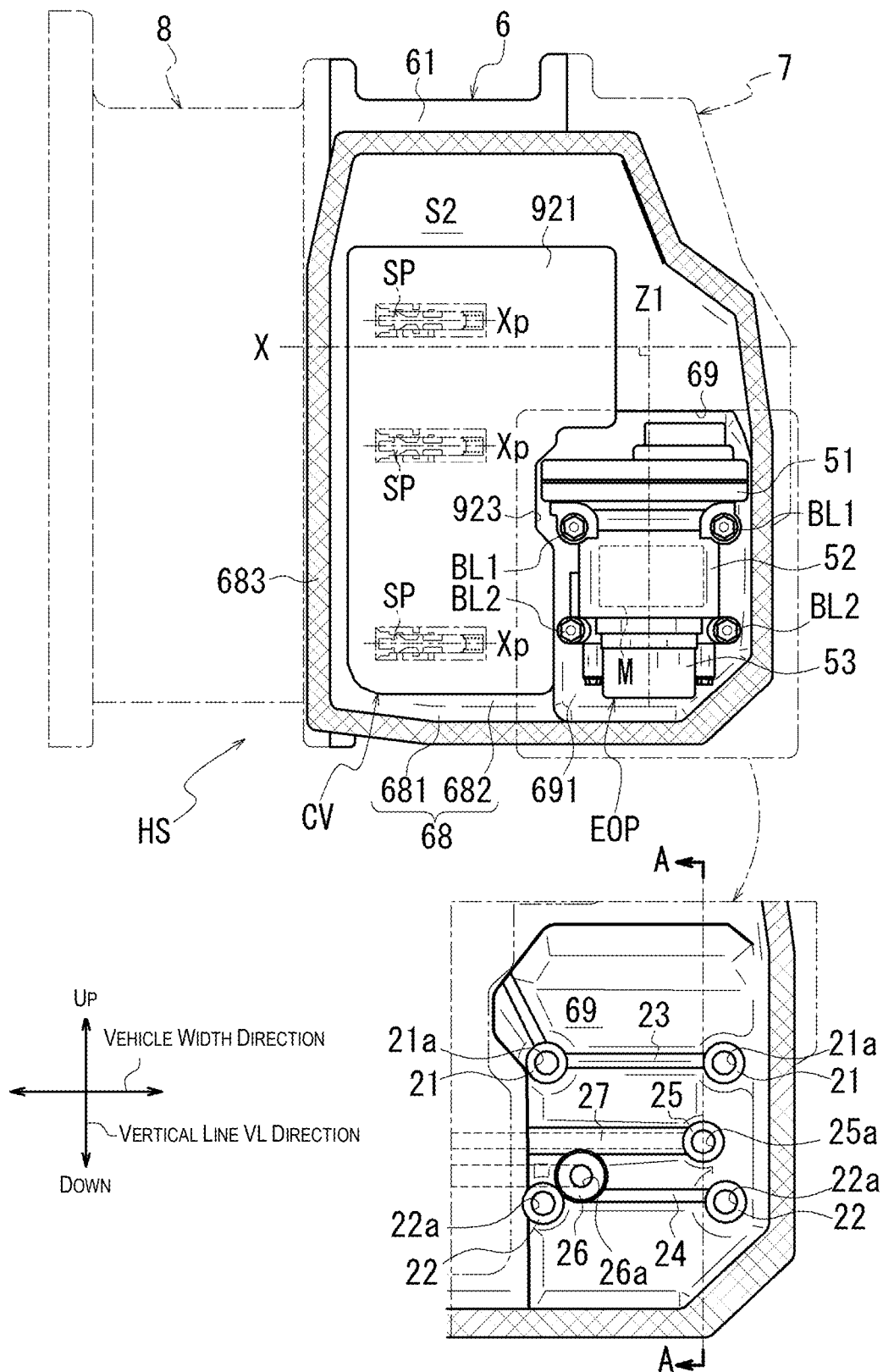
FIG. 8 is a view of the housing section as viewed from the front of the vehicle.

FIG. 8 is a view of the housing section 68 from the front of the vehicle. In this figure, the second chamber S2, as viewed from the front of the vehicle, is schematically shown along with other components of the housing HS (the case 6, the first cover 7, the second cover 8). Additionally, cross-hatching is applied to the area of the joining section 683 located toward the viewer so as to indicate the location thereof. The appearance of the control valve CV is shown schematically.

The enlarged view in FIG. 8 schematically shows an enlarged view of the part of the housing chamber 69 (third support wall) located away from the viewer on the side of the electric oil pump EOP.

As shown in FIG. 8, viewed from the front of the vehicle, the housing section 68 has a circumferential wall section 681 that surrounds the entire outer circumference of the second chamber S2. The end surface of the circumferential wall section 681 toward the viewer serves as the joining section 683 with the third cover 9.

As shown in FIG. 1, the housing section 68 is provided in the direction along the axis of rotation X of the power transmission device 1. The housing section 68 is formed having a range in the direction of the axis of rotation X (left-right direction in the diagram) from the region adjacent to the circumferential wall section 61 of the case 6 to the side of the first cover 7.

As shown in FIG. 1, the inside of the housing section 68 is divided such that approximately half of the area on the side of the second cover 8 (right side in the diagram) forms the bottom wall section 682 (second support wall), and approximately half of the area on the side of the first cover 7 forms the bottom wall section 691 (third support wall). The bottom wall sections 682 and 691 are provided staggered in the vehicle front-rear direction.

The bottom wall section 682 is integrally formed with the circumferential wall section 61 on the side of the case 6. The bottom wall section 691 is provided on the vehicle front side of the first cover 7, with a gap between the bottom wall section and the outer circumference of the first cover 7.

As shown in FIG. 8, inside the second chamber S2, the control valve CV is arranged upright with the stacking direction of the valve bodies 921, 921 aligned in the vehicle front-rear direction (the direction toward and away from the viewer in the diagram).

In the second chamber S2, the control valve CV is arranged upright to satisfy the following conditions. (a) Multiple pressure regulating valves SP (spool valves) inside the control valve CV are aligned in the vertical line VL direction (vertical direction) based on the installation state of the power transmission device 1 in the vehicle V, and (b) the advancement and retraction direction Xp of the pressure regulating valves SP (spool valves) is aligned in the horizontal line direction.

With this configuration, the control valve CV is arranged upright inside the second chamber S2, ensuring that the movement of the pressure regulating valves SP (spool valves) is not hindered. The second chamber S2 thus does not increase in size in the vehicle front-rear direction.

Viewed from the front of the vehicle, the control valve CV substantially forms an L-shape provided with a cut-out section 923 in a substantially rectangular valve body 921. The cut-out section 923 is provided to avoid interference with the electric oil pump EOP.

From the front of the vehicle, part of the electric oil pump EOP toward the side of the second cover 8 (left side in the diagram) is housed inside the cut-out section 923.

Therefore, when viewed from the vertical line VL direction, part of the electric oil pump EOP is provided in a positional relationship overlapping with the control valve CV.

As shown in FIG. 8, inside the second chamber S2, the control valve CV and the electric oil pump EOP are aligned in the direction of the axis of rotation X of the power transmission device 1 (left-right direction in the diagram).

Viewed from the front of the vehicle, the control valve CV is positioned overlapping with the case 6. Viewed from the front of the vehicle, the electric oil pump EOP is positioned overlapping with the first cover 7.

The electric oil pump EOP has a basic configuration in which a control unit 51, a motor unit 52, and a pump unit 53 are aligned in series in the direction of an axis of rotation Z1 of the motor M.

The electric oil pump EOP is provided oriented such that the axis of rotation Z1 is orthogonal to the axis of rotation X of the power transmission device 1. In this state, the electric oil pump EOP is arranged upright with the pump unit 53 positioned on the upper side inside the second chamber S2 (housing chamber 69) and the control unit 51 on the lower side inside the second chamber S2 (housing chamber 69).

Figure 9:
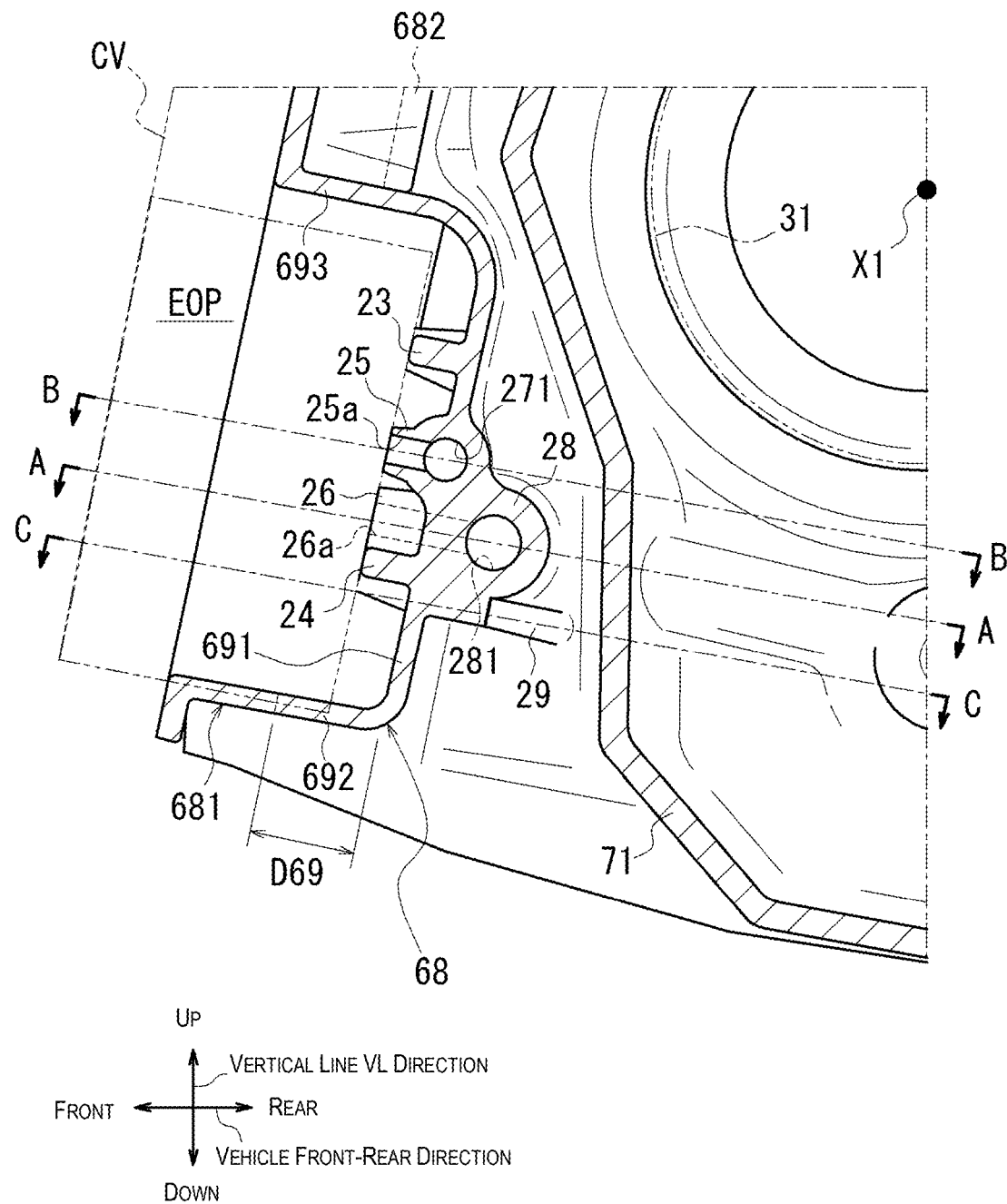
FIG. 9 is a schematic diagram of a cross-section of the housing along line A-A in FIG. 8.

FIG. 9 is a schematic diagram of a cross-section of the housing HS cut along line A-A in FIG. 8. In FIG. 9, the cross-section of the part of the housing chamber 69 inside the second chamber S2 is schematically shown along with the cross-section of the circumferential wall section 71 of the first cover 7, which is located toward the rear of the vehicle.

As shown in FIG. 8, inside the bottom wall section 682 of the housing section 68, the housing chamber 69 for the electric oil pump EOP is provided in the region overlapping with the first cover 7 when viewed from the front of the vehicle.

As shown in FIG. 9, the housing chamber 69 is formed by causing the bottom wall section 682 to bulge toward the side of the first cover 7 (right side in FIG. 9). The bottom wall section 691 of the housing chamber 69 is positioned at a depth D69 away from the bottom wall section 682 toward the side of the first cover 7. The wall section 693 connecting to the upper side of the bottom wall section 682 extends toward the front of the vehicle above the electric oil pump EOP. The wall section 692 connecting to the lower side of the bottom wall section 682 extends toward the front of the vehicle below the electric oil pump EOP and is located along the extension of the circumferential wall section 681 of the housing section 68.

In this embodiment, a part of the electric oil pump EOP on the side of the first cover 7 is housed inside the housing chamber 69.

As shown in the enlarged view of FIG. 8, the bottom wall section 691 of the housing chamber 69 is provided with two pairs of bosses 21, 22, each having bolt holes 21a, 22a.

In the housing chamber 69, the bosses 21, 21 are aligned horizontally spaced apart on the upper side in the vertical line VL direction. The bosses 22, 22 are aligned horizontally spaced apart below the bosses 21, 21 in the vertical line VL direction.

Bolts BL1, BL1 that penetrate the electric oil pump EOP are screwed into the bolt holes 21a, 21a of the bosses 21, 21.

The bolts BL2, BL2 that penetrate the electric oil pump EOP are screwed into the bolt holes 22a, 22a of the bosses 22, 22.

This positions and secures the electric oil pump EOP at a predetermined location on the bottom wall section 691 inside the housing chamber 69.

A reinforcing rib 23 is provided spanning between the bosses 21 and 21 on the bottom wall section 691. The rib 23 is arranged in a direction along the horizontal line.

In the bottom wall section 691, a boss 26 is provided adjacent to the boss 22 on the control valve CV side. The boss 26 has a supply port 26a for the oil OL opening therein.

Below the bottom wall section 691, a reinforcing rib 24 spans between boss 26 and boss 22. The rib 24 is oriented in the horizontal line direction.

On the side of the boss 22 to which the rib 24 connects (right side in the diagram), a boss 25 is provided above the boss 22. The boss 25 has a discharge port 25a for the oil OL opening therein.

On the side of the control valve CV (left side in the diagram), viewed from the boss 25, a bulging section 27 is provided bulging toward the viewer. The bulging section 27 extends toward the control valve CV side along the horizontal line.

As shown in FIG. 9, the bottom wall section 691 of the housing chamber 69 is spaced apart from the circumferential wall section 71 of the first cover 7. On the outer circumference of the bottom wall section 691, a bulging section 28 is provided bulging toward the side of the circumferential wall section 71 (right side in the diagram). The bulging section 28 is located on the opposite side of the boss 26, with the bottom wall section 691 sandwiched therebetween. An oil path 281 is provided inside the bulging section 28. The oil path 281 connects to the oil OL supply port 26a provided in boss 26.

Figure 10:
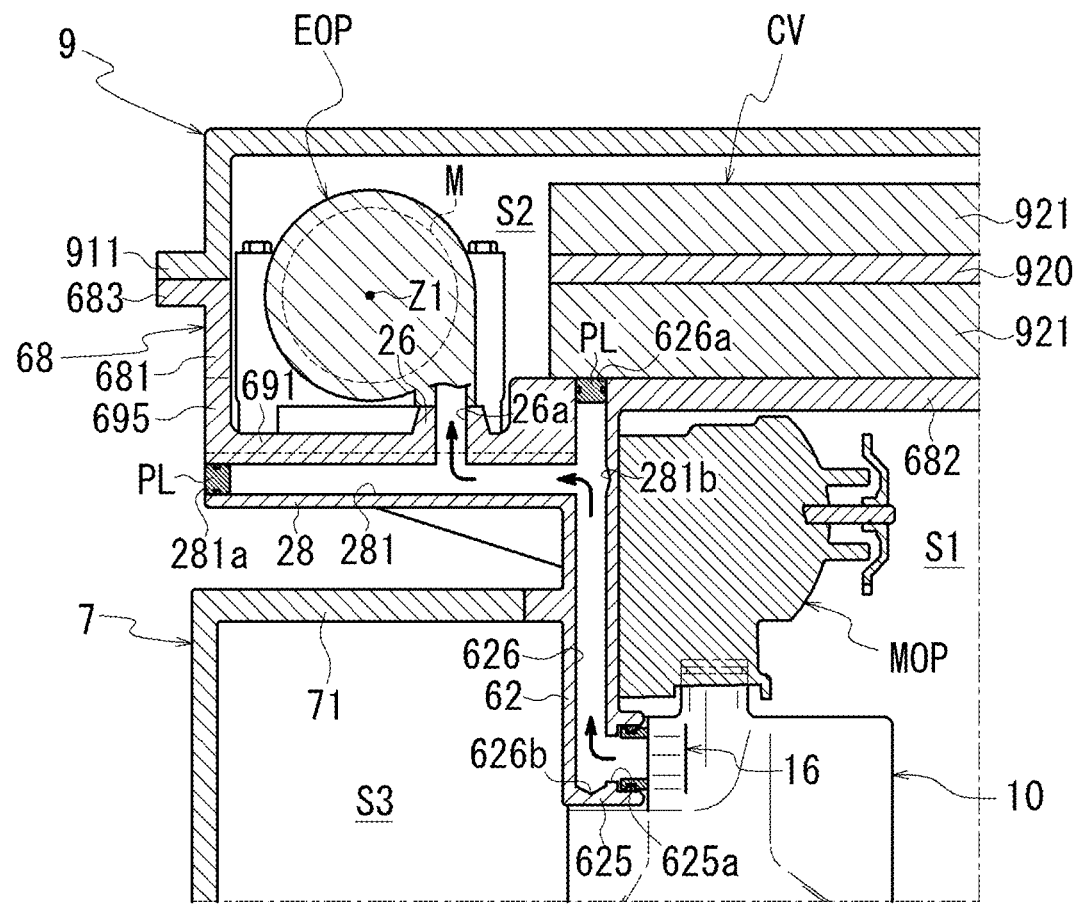
FIG. 10 is a schematic diagram of a cross-section of the housing along line A-A in FIG. 9.

FIG. 10 is a cross-sectional diagram of the housing HS along line A-A in FIG. 9.

As shown in FIG. 10, the oil path 281 extends in a straight line inside the bulging section 28 attached to the bottom wall section 691 in the direction of the axis of rotation X of the power transmission device. The bulging section 28 is provided spanning between the bottom wall section 691 and the partition section 62. The oil path 281 is a dead-end hole provided in the bulging section 28.

The base end 281a of the oil path 281 opens into the end surface of the bulging section 28. The opening on the base end 281a side of the oil path 281 is sealed with a plug PL.

The tip end 281b of the oil path 281 intersects the oil path 626 in the partition section 62.

The oil path 626 extends in a straight line inside the partition section 62. The oil path 626 is a dead-end hole provided in the partition section 62. A base end 626a of the oil path 626 opens into the second chamber S2. The opening on the base end 626a side of the oil path 626 is sealed with a plug PL.

A tip end 626*b* of the oil path 626 connects to the connection port 625*a* of the aforementioned connection section 625.

In this specification, the term "dead-end hole" refers to a straight oil hole that is closed at one end (the tip). The oil paths 281 and 626, for example, are formed by drilling into the case 6 (the bulging section 28) after casting. In the case of the oil path 281, the hole is drilled without penetrating the area of the bulging section 28, making the tip a dead end. That is, a "dead-end hole" is a hole formed so that the tip becomes a dead end without penetrating the processing area of the oil path, typically formed by drilling or the like.

In this embodiment, two dead-end holes are connected to form the oil paths 626, 281 which connect the electric oil pump EOP and the strainer 10.

When the electric oil pump EOP is operated, the oil OL collected at the bottom of the housing HS is suctioned through the strainer 10. Into the oil path 626, the oil OL suctioned by the strainer 10 flows in from the second connection section 16.

The oil OL that flows into the oil path 626 then flows into the oil path 281, which opens on the side of the second chamber S2 inside the oil path 626, and is supplied to the electric oil pump EOP from the supply port 26*a* for the oil OL that connects to the oil path 281.

Figure 11:
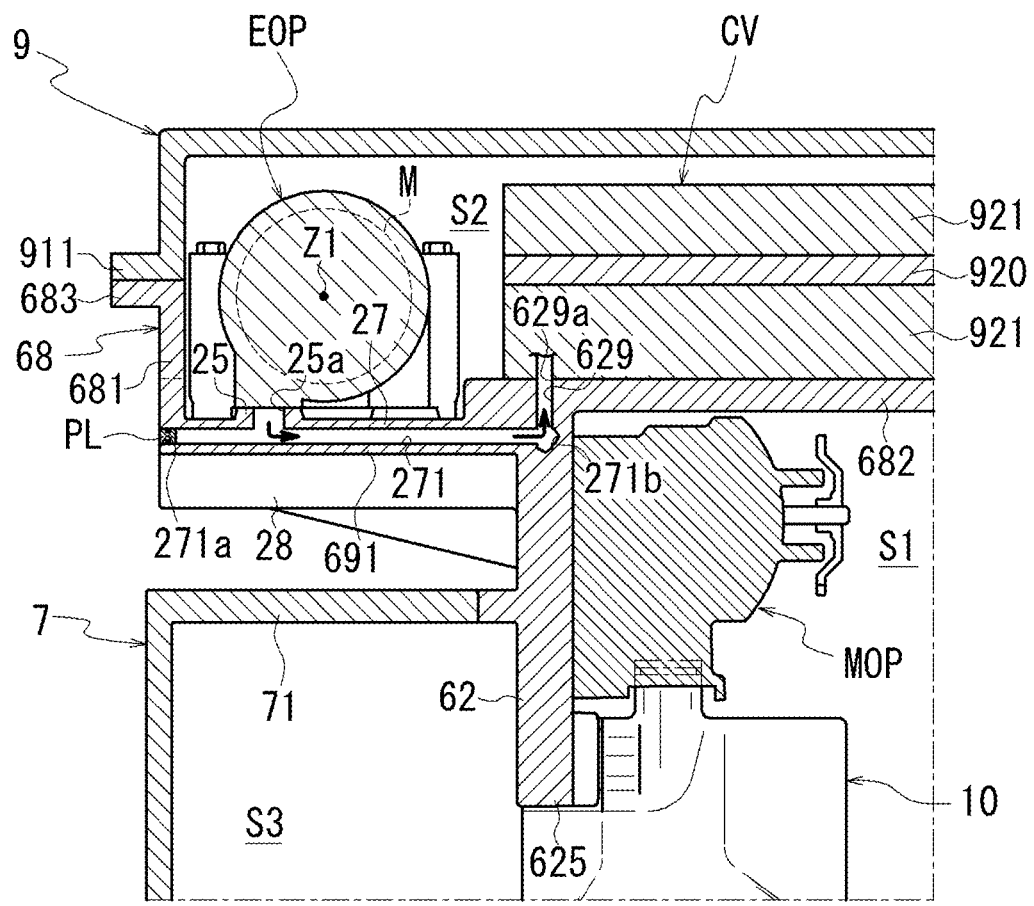
FIG. 11 is a schematic diagram of a cross-section of the housing along line B-B in FIG. 9.
Figure 11:
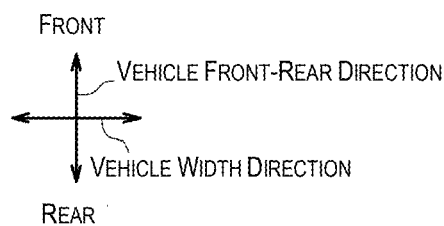

FIG. 11 is a cross-sectional diagram of the housing HS along line B-B in FIG. 9.

As shown in FIG. 11, the oil path 271 extends in a straight line inside the bulging section 27 attached to the bottom wall section 691 in the direction of the axis of rotation X of the power transmission device. The bulging section 27 is provided spanning between the bottom wall section 691 and the partition section 62. The oil path 271 is a dead-end hole provided in the bulging section 27. The base end 271*a* of the oil path 271 opens into the end surface of the bulging section 27. The opening at the base end 271*a* side of the oil path 271 is sealed with a plug PL.

The tip end 271*b* of the oil path 271 intersects with the oil path 629 inside the partition section 62.

The oil path 629 extends in a straight line inside the partition section 62. The oil path 629 is a dead-end hole provided in the partition section 62. The base end 629*a* of the oil path 629 connects to the control valve CV located inside the second chamber S2.

An oil discharge port 25*a* connects to the oil path 271.

When the electric oil pump EOP is operated, the oil OL pressurized inside the electric oil pump EOP is supplied to the oil path 271 from the discharge port 25*a*.

The oil OL supplied to the oil path 271 is then supplied to the control valve CV through the oil path 629.

Figure 12:
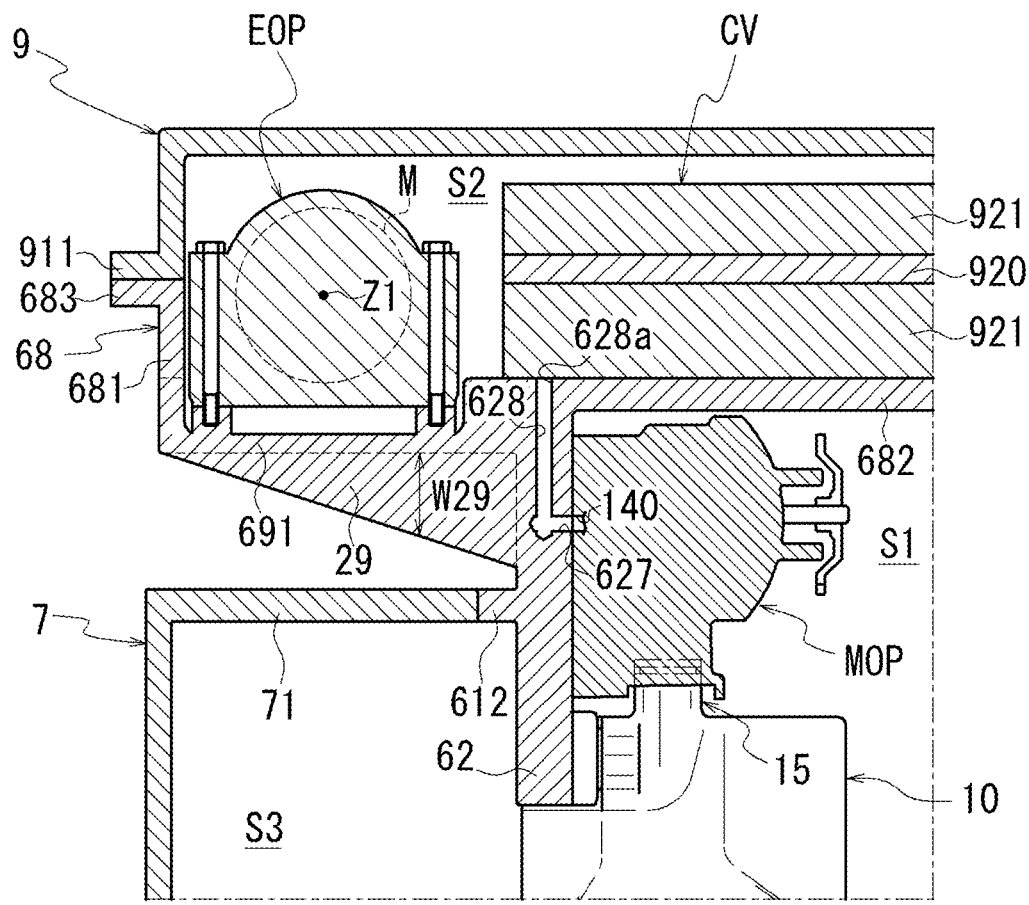
FIG. 12 is a schematic diagram of a cross-section of the housing along line C-C in FIG. 9.

FIG. 12 is a cross-sectional view of the housing HS along line C-C in FIG. 9.

As shown in FIG. 12, a rib 29 is provided on the outer circumference of the bottom wall section 691.

As shown in FIG. 9, the rib 29 extends from the area below the bulging section 28 toward the circumferential wall section 71 of the first cover 7. The rib 29 is provided substantially parallel to the lower wall section 692 of the housing chamber 69.

As shown in FIG. 12, the rib 29 is provided spanning between the bottom wall section 691 and the partition section 62. The rib 29 is formed in a shape such that the width W29 of a bulge protruding from the bottom wall section 691 widens as it approaches the partition section 62. Therefore, when viewed from the vertical line VL direction, the rib 29 is provided at an angle.

The circumferential wall section 71 of the first cover 7 is joined to the partition section 62 of the case 6, and the bottom wall section 691 extends in a direction away from the partition section 62 toward the side of the circumferential wall section 71 from the partition section 62.

The rib 29 is provided utilizing the gap between the circumferential wall section 71, the partition section 62, and the bottom wall section 691.

In the partition section 62, the oil path 628 is provided in the area overlapping with the rib 29 from the side of the mechanical oil pump MOP (right side in the diagram). The oil path 628 is a dead-end hole provided in the partition section 62. The base end 628*a* of the oil path 628 connects to the control valve CV located inside the second chamber S2.

When the mechanical oil pump MOP is operated, the oil OL collected at the bottom of the housing HS is suctioned into the mechanical oil pump MOP through the strainer 10. The oil OL suctioned by the strainer 10 flows into the mechanical oil pump MOP from the first connection section 15. The oil OL pressurized by the mechanical oil pump MOP is then supplied to the oil path 628 through the discharge port 140 and the connection section 627. The oil OL supplied to the oil path 628 is then supplied to the control valve CV through the oil path 628.

Thus, in the power transmission device 1, the electric oil pump EOP is supported by the bottom wall section 691. The bottom wall section 691 is a wall section separate from the partition section 62, which is involved in supporting the mechanical oil pump MOP. The bottom wall section 691, which runs along the axis of rotation X of the power transmission device 1, and the partition section 62, which is orthogonal to the axis of rotation X, are provided in orientations orthogonal to each other. The rib 29 provided on the outer circumference of the bottom wall section 691 spans between the bottom wall section 691 and the partition section 62, thereby enhancing the structural rigidity of both the bottom wall section 691 and the partition section 62.

By mounting the mechanical oil pump MOP on the side of the first chamber S1 of the partition section 62 and the electric oil pump EOP on the side of the second chamber S2 of the bottom wall section 691, the support stability of both the mechanical oil pump MOP and the electric oil pump EOP is improved.

When the mechanical oil pump MOP and the electric oil pump EOP are mounted both sides of the same wall section, there tends to be an increase in noise due to the natural frequencies of each pump. As noted above, the mechanical oil pump MOP and the electric oil pump EOP are provided on different wall sections, and the axis of rotation of the mechanical oil pump MOP and the axis of rotation of the electric oil pump EOP are arranged in a positional relationship that is orthogonal (a positional relationship that is neither parallel nor coaxial). Therefore, a reduction in noise caused by the natural frequencies of each pump can be expected.

Furthermore, in the bottom wall section 691 that supports the electric oil pump EOP, a bulging section 28 is located on one side in the thickness direction, and another bulging section 27 is located on the other side.

In supporting the electric oil pump EOP, instead of increasing the overall thickness of the bottom wall section 691, the thickness is increased locally, and the directions of the bulges of the thickened parts are staggered vertically.

This ensures the rigidity of the bottom wall section 691 without increasing the overall thickness of the bottom wall section 691. This enhances the support stability of the electric oil pump EOP in the bottom wall section 691 without significantly increasing the weight of the power transmission device 1.

Additionally, since there is a gap between the bottom wall section 613 and the first cover 7, there is extra space to place the bulging section 28 and the rib 29 between the bottom wall section 691 and the first cover 7.

This allows for the arrangement of the bulging section 28 and the rib 29 spanning between the bottom wall section 691 and the partition section 62 without increasing the size of the housing HS, thereby enhancing the rigidity of both the bottom wall section 691 and the partition section 62.

There is no need to increase the thickness of the bottom wall section 691 and the partition section 62 as when the electric oil pump EOP and the mechanical oil pump MOP are mounted on both sides of the same wall section.

Making the partition section 62 thicker could lead to an increase in size of the power transmission device 1 in the direction of the axis of rotation X (vehicle width direction), and making the bottom wall section 691 thicker could lead to an increase in size in the diameter direction of the axis of rotation X (vehicle front-rear direction).

As noted above, by providing the electric oil pump EOP and the mechanical oil pump MOP on different wall sections, it is possible to suitably prevent the power transmission device 1 from increasing in size due to the thicker wall sections.

As described above, the power transmission device 1 according to this embodiment has the following configuration.

(1) The power transmission device 1 comprises the housing HS (case) that houses the power transmission mechanism, the control valve CV that controls the oil pressure supplied to the power transmission mechanism and is arranged upright inside the housing HS, and the mechanical oil pump MOP (first pump) and an electric oil pump EOP (second pump) that supply oil OL to the control valve CV.

The housing HS comprises the partition section 62 (first support wall) that supports the axis of rotation of the power transmission mechanism, the bottom wall section 682 (second support wall) that supports the control valve CV and is positioned in the direction along the axis of rotation, the first chamber S1 located on one side of the partition section 62, the second chamber S2 adjacent to the first chamber S1, separated by the bottom wall section 682, and the bottom wall section 691 (third support wall) that extends from the bottom wall section 682 along the axis of rotation to the other side of the partition section 62.

The mechanical oil pump MOP is mounted to the partition section 62 inside the first chamber S1.

The electric oil pump EOP is mounted on the bottom wall section 691 inside the second chamber S2.

With this configuration, in the housing HS, the electric oil pump EOP is provided on the bottom wall section 691, which is a different wall section from the partition section 62 that contributes to the support of the mechanical oil pump MOP. That is, the electric oil pump EOP and the mechanical oil pump MOP are supported by different wall sections (bottom wall section 691, partition section 62) inside the housing HS.

This arrangement reduces the rigidity requirements for each wall section compared to when the electric oil pump EOP and the mechanical oil pump MOP are supported by the same wall section. For instance, if the electric oil pump EOP and the mechanical oil pump MOP were supported by the partition section 62, it would be necessary to increase the thickness of the partition section 62 to enhance the rigidity thereof. This would result in an increase in the size of the power transmission device 1 by the thickness of the partition section 62, as well as an increase in the overall weight of the power transmission device 1.

In particular, when the mechanical oil pump MOP and the electric oil pump EOP are supported on both sides of the same wall section (i.e., the pumps are arranged facing each other), and the axis of rotation of the electric oil pump EOP and the axis of rotation of the mechanical oil pump MOP are arranged parallel or coaxially along the axis of rotation of the power transmission device, it is necessary to make the wall section thicker in the direction of the axis of rotation. In such cases, the power transmission device increases in size in the direction of the axis of rotation.

For example, if the power transmission device 1 is installed in a front-engine, front-drive vehicle (an FF vehicle), an increase in size of the power transmission device 1 in the vehicle width direction along the axis of rotation could impact the ability to install the power transmission device in the vehicle.

In front-wheel-drive vehicles, the power transmission device is positioned between the left and right drive wheels WH, WH.

Not only the power transmission device 1 but also the drive source (engine) and other components are positioned between the left and right drive wheels WH, WH. Therefore, the dimension of the power transmission device 1 in the direction of the axis of rotation is a critical factor affecting installation compatibility, and it is desirable to keep the dimension of the power transmission device 1 in the direction of the axis of rotation as small as possible.

As noted above, by supporting the electric oil pump EOP and the mechanical oil pump MOP on different wall sections (the bottom wall section 691, the partition section 62), it is possible to prevent an increase in size of the power transmission device 1 in the direction of the axis of rotation. This makes it possible to suitably reduce the impact on vehicle installation compatibility and appropriately suppress an increase in the weight of the power transmission device 1.

Additionally, when the electric oil pump EOP and the mechanical oil pump MOP are positioned on both sides of the same partition in the thickness direction, noise issues due to the natural frequencies of each pump may arise. To reduce noise caused by vibration, measures such as making the wall sections thicker or revising the pump positioning are necessary. Making the wall sections thicker leads to an increase in the size and weight of the power transmission device. Revising the pump positioning could compromise layout flexibility.

By supporting the electric oil pump EOP and the mechanical oil pump MOP on different wall sections, it is possible to suitably prevent an increase in the size and weight of the power transmission device 1 while ensuring layout flexibility.

(2) The third chamber S3 is located on the other side of the partition section 62.

The bottom wall section 691 (third support wall) is positioned alongside the third chamber S3.

The bottom wall section 691 forms the second chamber S2 together with the bottom wall section 682.

Viewed from the diameter direction of the axis of rotation X, the second chamber S2 is in a positional relationship overlapping with the first chamber S1 and the third chamber S3.

With this configuration, the second chamber S2 is positioned radially outward from the first chamber S1 and the third chamber S3, as viewed along the axis of rotation X. The second chamber S2 extends along nearly the entire length of the housing HS in the direction of the axis of rotation X. Inside the second chamber S2, the control valve CV, mounted to the bottom wall section 682, and the electric oil pump EOP, mounted to the bottom wall section 691, are arranged in line along the axis of rotation X of the power transmission device 1.

If the second chamber S2 is provided adjacent to the first chamber S1 using only the bottom wall section 682 to form the second chamber S2, unused space would remain on the side of the third chamber S3. As noted above, by providing the bottom wall section 691 and using both the bottom wall section 682 and the bottom wall section 691 to form the second chamber S2, the second chamber S2 is formed extending from the side of the first chamber S1 to the side of the third chamber S3. This ensures space to accommodate the electric oil pump EOP inside the second chamber S2. Therefore, the components of the power transmission device 1 can be arranged without leaving significant unused space around the housing HS.

If the control valve CV and the electric oil pump EOP cannot be arranged side by side in the direction of the axis of rotation X, the control valve CV and the electric oil pump EOP would be aligned in the diameter direction of the axis of rotation X (vehicle front-rear direction). In such a case, the power transmission device 1 would increase in size in the diameter direction of the axis of rotation X (vehicle front-rear direction). Being able to arrange the control valve CV and the electric oil pump EOP side by side in the direction of the axis of rotation X can suitably prevent the power transmission device 1 from increasing in size in the diameter direction of the axis of rotation X (vehicle front-rear direction).

(3) The power transmission device 1 has the strainer 10 attached to the partition section 62, and
the oil paths (the oil path 626, the oil path 281) for the electric oil pump EOP (second pump) that connect the strainer 10 and the electric oil pump EOP (second pump).

The oil paths for the second pump (the oil path 626, the oil path 281) have
the oil path 626 (first oil path), which extends linearly inside the partition section 62, and
the oil path 281 (second oil path), which extends linearly inside the bottom wall section 691 and communicates with oil path 626.

The oil path 626 is a dead-end hole that opens into the second chamber S2.

The oil path 281 is a dead-end hole that opens at the end of the bottom wall section 691.

The opening at the base end 626a of the oil path 626 and the opening at the base end 281a of the oil path 281 are each sealed with a plug PL.

When the electric oil pump EOP and the mechanical oil pump MOP are provided on different wall sections (bottom wall section 691, partition section 62), the oil path 626 and the oil path 281 can be made to merge by simply forming oil holes in each wall section (bottom wall section 691, partition section 62) so that the oil paths 626 (first oil path) which is provided straight and the oil path 281 (second oil path) which is provided straight can be made to intersect. This allows the oil paths to be formed more easily than if the electric oil pump EOP and the mechanical oil pump MOP were located on the same wall section.

(i) The oil path 626 is a straight machined hole with a closed end forming a dead end, the base opening into the second chamber S2.

The oil path 281 is a straight machined hole with a closed end forming a dead end, the base opening at the end of the bottom wall section 691.

An oil path connecting the strainer 10 and the electric oil pump EOP is formed by causing these two machined holes having closed ends to intersect.

With this configuration, the oil path connecting the strainer 10 and the electric oil pump EOP can be easily formed by simply providing the two straight machined holes so as to intersect.

(4) The mechanical oil pump MOP is supported by the partition section 62 near the bottom wall section 682 inside the first chamber S1.

With this configuration, the mechanical oil pump MOP is positioned closest to the control valve CV inside the second chamber S2. In the second chamber S2, since the electric oil pump EOP is positioned close to the control valve CV, the electric oil pump EOP is positioned adjacent in the direction of the axis of rotation X, and the mechanical oil pump MOP is positioned adjacent in the diameter direction of the axis of rotation X, relative to the control valve CV.

This allows for shortening the lengths of the oil paths (oil path 271, oil path 629) connecting the electric oil pump EOP and the control valve CV, and the oil path 628 connecting the mechanical oil pump MOP and the control valve CV. Consequently, the time required to supply the oil OL from the pumps (mechanical oil pump MOP, electric oil pump EOP) to the control valve CV is reduced, which can be expected to improve oil pressure responsiveness in the control valve CV.

(5) The bottom wall section 691 is formed thicker in the area where the oil path 281 (second oil path) is provided than other areas.

With this configuration, even though the oil path 281 is formed inside the bottom wall section 691, the rigidity of the bottom wall section 691 can be maintained.

Additionally, since the oil path 281 extends to the partition section 62, the thickened area of the bottom wall section 691 also extends to the partition section 62. Therefore, the thickened area of the bottom wall section 691 also functions as a reinforcing rib for the bottom wall section 691, ensuring the support strength for the electric oil pump EOP in the bottom wall section 691.

(6) The third oil path (oil path 271, oil path 629) connects the electric oil pump EOP and the control valve CV.

In the bottom wall section 691, the oil path 281 (second oil path) and the oil path 271 (third oil path) are arranged vertically.

The thickness of the area where oil path 271 is provided in the bottom wall section 691 is also made thicker.

In the bottom wall section 691, the bulging direction of the area of oil path 281 is on one side of the bottom wall section 691, while the bulging direction of oil path 271 is on the other side.

With this configuration, for example, the bulging direction of the area of oil path 281 (bulging section 28) is on the side of the third chamber S3, which is located on one side of the bottom wall section 691, and the bulging direction of oil path 271 (bulging section 27) is on the opposite side of the third chamber S3.

This ensures the rigidity of the bottom wall section 691.

(7) The power transmission device 1 has the circumferential wall section 71 that surrounds the outer perimeter of the third chamber S3, and the rib 29 that bulges toward the side of the circumferential wall section 71 from the bottom wall section 691.

The circumferential wall section 71 is connected to the partition section 62 and is spaced apart from the bottom wall section 691.

The rib 29 is provided spanning between the partition section 62 and the bottom wall section 691, in the gap (diameter direction of the axis of rotation X) between the circumferential wall section 71 and the bottom wall section 691.

The third chamber S3 is smaller in the adjacent direction (diameter direction of the axis of rotation X) of the first chamber S1 and the second chamber S2 than the first chamber S1, leaving a gap between the third chamber S3 and the second chamber S2, thus providing extra space.

By using the thickened area of the bottom wall section 691 as the rib 29 that bulges into the space between the third chamber S3 and the second chamber S2, the unused space around the housing HS can be effectively utilized while ensuring the rigidity of the bottom wall section 691.

(8) The rib 29 is formed in a shape such that the bulging width W19 from the bottom wall section 691 widens while approaching the partition section 62.

With this configuration, the rigidity of the partition section 62 and the bottom wall section 691 can be ensured, while suppressing an increase in the weight of the housing HS.

(ii) Inside the second chamber S2, the control valve CV is arranged with multiple pressure regulating valves SP aligned in the vertical direction.

Viewed from the direction of the axis of rotation X of the power transmission device 1, the control valve CV is in a positional relationship overlapping with the electric oil pump EOP.

If the control valve CV is arranged with the plurality of pressure regulating valves SP aligned in the horizontal line direction, the control valve CV occupies a significant amount of space in the horizontal line direction.

By arranging the control valve CV with multiple pressure regulating valves SP aligned vertically, the horizontal line direction space required for the installation of the control valve is reduced compared to when the control valves are aligned so that the plurality of pressure regulating valves are arranged horizontally.

This reduces the thickness of the second chamber S2 in the horizontal line direction, suitably preventing an increase in size of the power transmission device 1 in the horizontal line direction.

Furthermore, by arranging the electric oil pump EOP upright in the second chamber S2 with the axis of rotation Z1 aligned vertically, the electric oil pump EOP can be provided inside the thickness range of the control valve CV as viewed from the direction of the axis of rotation Z1. This ensures that even if the electric oil pump EOP is provided in the second chamber S2, the second chamber S2 will not increase in size in the horizontal line direction. This can also suitably prevent an increase in size of the power transmission device 1 in the horizontal line direction.

In the foregoing embodiment, a case was illustrated in which the power transmission device 1 transmits the rotation of the engine ENG to the drive wheels WH, WH, but it is also possible for the power transmission device 1 to transmit the rotation of at least one of the engine ENG or the motor (rotating electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits the rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited to those aspects shown in the embodiments. The present invention may be appropriately modified within the scope of the technical concept of the invention.

DESCRIPTION OF THE REFERENCE SYMBOLS

1 Power transmission device; 2 Forward-reverse switching mechanism (power transmission mechanism); 3 Variator (power transmission mechanism); 4 Reduction mechanism (power transmission mechanism); 5 Differential device (power transmission mechanism); 29 Rib; 69 Partition section (first support wall); 682 Wall section (second support wall); 682B Wall section (third support wall); 626 Oil path (second pump oil path: first oil path); 626a Base end; 281 Oil path (second pump oil path: second oil path); 281a Base end; 271 Oil path (third oil path); 629 Oil path (third oil path); CV Control valve; HS Housing (case); MOP Mechanical oil pump (first pump); EOP Electric oil pump (second pump); PL Plug; S1 First chamber; S2 Second chamber; and S3 Third chamber.

The invention claimed is:

1. A power transmission device, comprising:
a case that houses a power transmission mechanism;
a control valve configured to control an oil pressure supplied to the power transmission mechanism, the control valve being arranged upright inside the case; and
a first pump and a second pump configured to supply oil to the control valve, wherein
the case has
a first support wall that supports an axis of rotation of the power transmission mechanism,
a second support wall that supports the control valve and is arranged aligned with the axis of rotation,
a first chamber located on one side of the first support wall,
a second chamber adjacent to the first chamber across the second support wall, and
a third support wall extending from the second support wall along the axis of rotation to the other side of the first support wall,
the first pump is mounted on the first support wall inside the first chamber, and the second pump is mounted on the third support wall inside the second chamber.

2. The power transmission device as claimed in claim 1, wherein
   a third chamber is located on the other side of the first support wall,
   the third support wall is located on a side of the third chamber,
   the third support wall forms the second chamber with the second support wall, and
   as viewed from a radial direction of the axis of rotation, the second chamber is provided in a positional relationship overlapping the first chamber and the third chamber.

3. The power transmission device as claimed in claim 2, further comprising
   a strainer attached to the first support wall, and
   an oil path for the second pump connecting the strainer and the second pump,
   the oil path for the second pump has
      a first oil path that extends in a straight line inside the first support wall, and
      a second oil path that extends in a straight line inside the third support wall and communicates with the first oil path,
   the first oil path is a dead-end hole that opens in the second chamber, the second oil path is a dead-end hole that opens in an end section of the third support wall, and
   an opening at a base end of the first oil path and an opening at a base end of the second oil path are each sealed with a plug.

4. The power transmission device as claimed in claim 3, wherein
   the first pump is supported on the first support wall adjacent to the second support wall inside the first chamber.

5. The power transmission device as claimed in claim 3, wherein
   the third support wall is formed such that a thickness of an area where the second oil path is formed is greater than in other areas.

6. The power transmission device as claimed in claim 5, wherein
   a third oil path connecting the second pump and the control valve is provided,
   the second oil path and the third oil path are arranged vertically in the third support wall,
   the third support wall is formed so as to be thicker in an area where the third oil path is provided than in areas where the third oil path and the second oil path are not provided,
   in the third support wall, a bulging direction of an area of the second oil path is on one side of the third support wall, and the bulging direction of an area of the third oil path is the other side of the third support wall.

7. The power transmission device as claimed in claim 6, further comprising
   a circumferential wall section encircling an outer circumference of the third chamber, and
   a rib protruding from the third support wall toward the circumferential wall section, wherein
   the circumferential wall section is provided on the first support wall and is provided with a gap between the circumferential wall section and the third support wall, and
   the rib is provided spanning between the third support wall and the second support wall.

8. The power transmission device as claimed in claim 7, wherein
   the rib is formed such that a bulging width from the third support wall becomes wider closer to the first support wall.

9. The power transmission device as claimed in claim 1, wherein
   the first pump and the second pump are provided in a positional relationship not overlapping when viewed from a direction of the axis of rotation of the power transmission mechanism.

* * * * *